Figure 1:
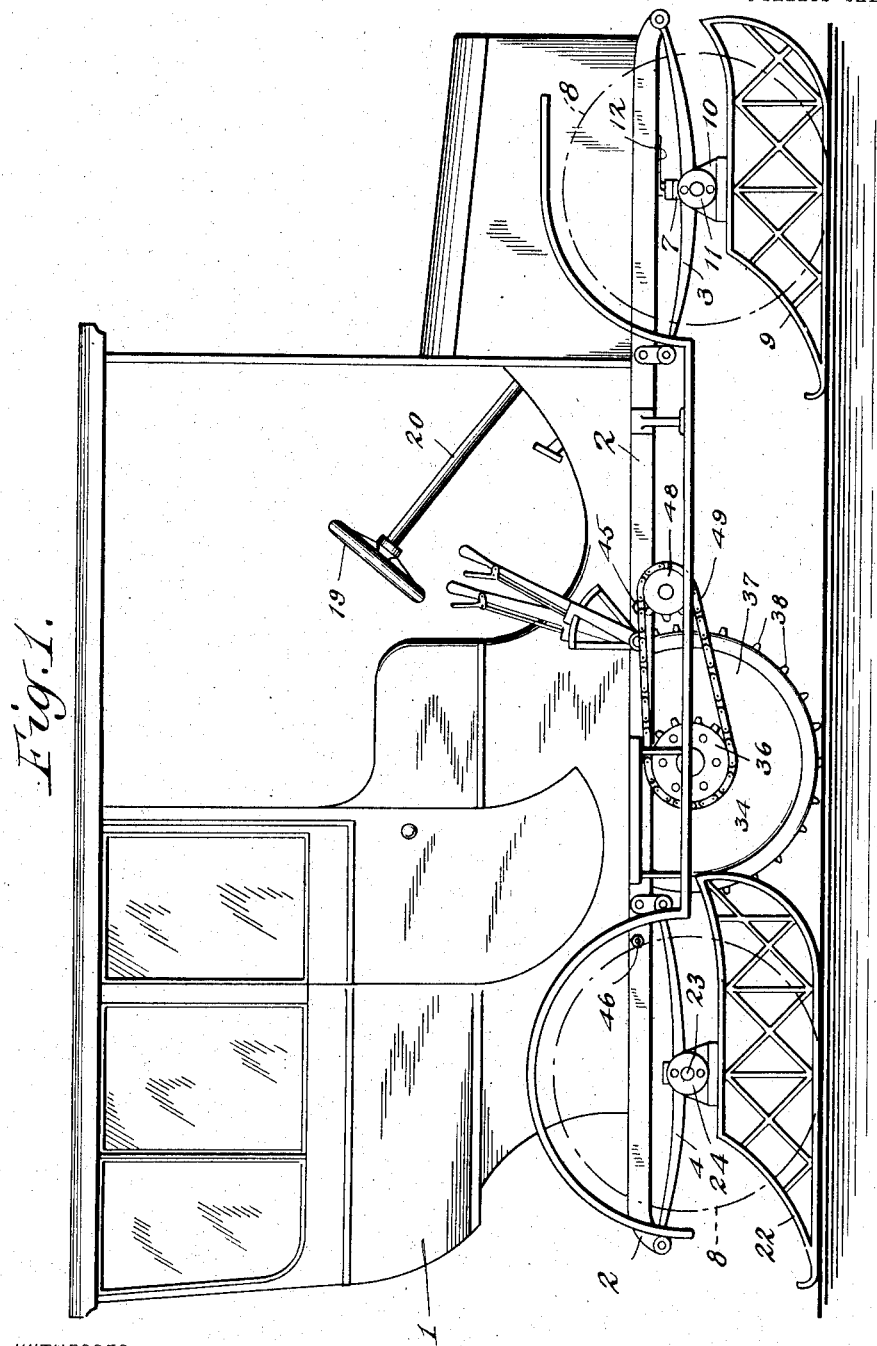

No. 893,867. PATENTED JULY 21, 1908.
E. S. H. PEREYRA.
AUTOMOBILE.
APPLICATION FILED DEC. 28, 1907.

3 SHEETS—SHEET 1.

WITNESSES
H. Crocheron
George Pülschen

INVENTOR
Eugene S. H. Pereyra

No. 893,867. PATENTED JULY 21, 1908.
E. S. H. PEREYRA.
AUTOMOBILE.
APPLICATION FILED DEC. 28, 1907.
3 SHEETS—SHEET 2.
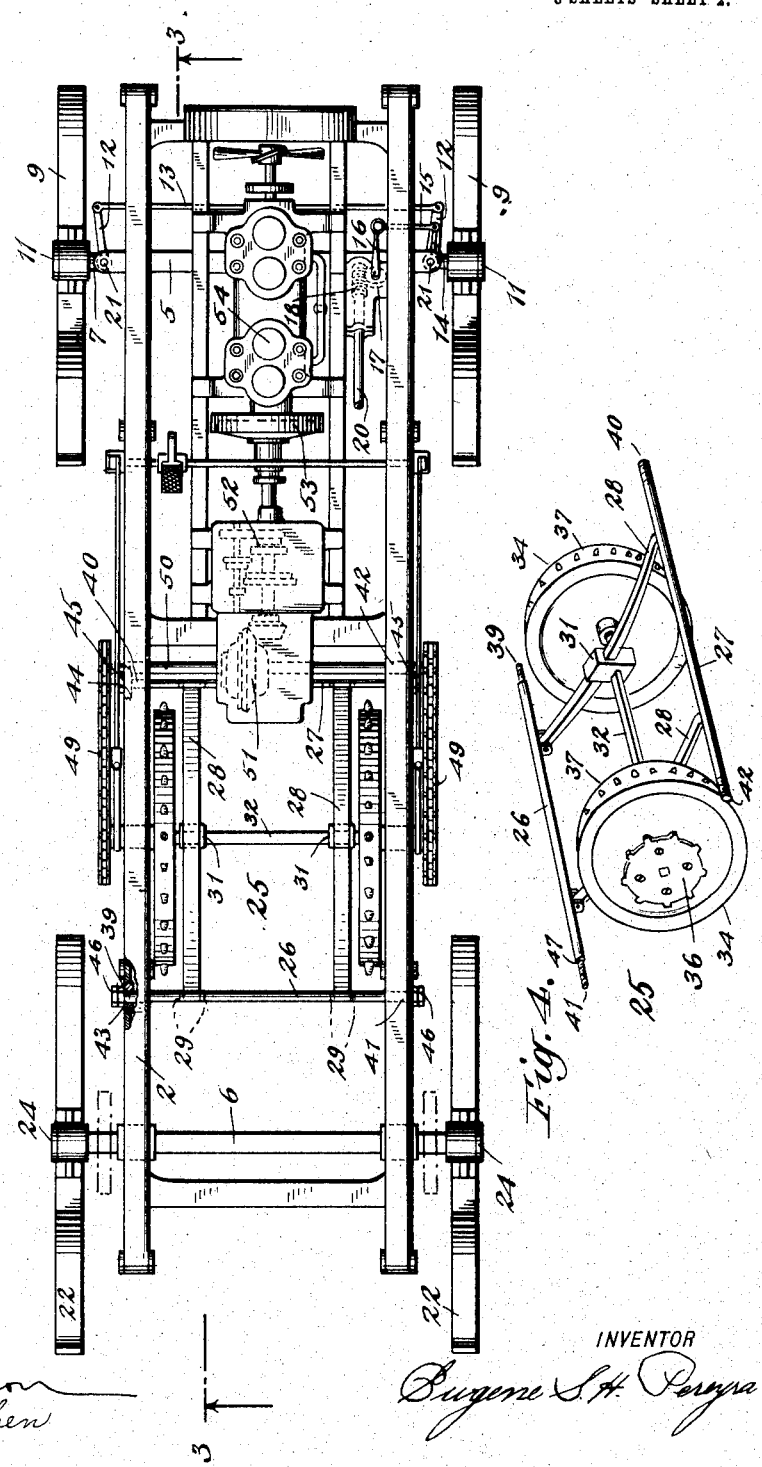
WITNESSES
INVENTOR
Eugene S. H. Pereyra

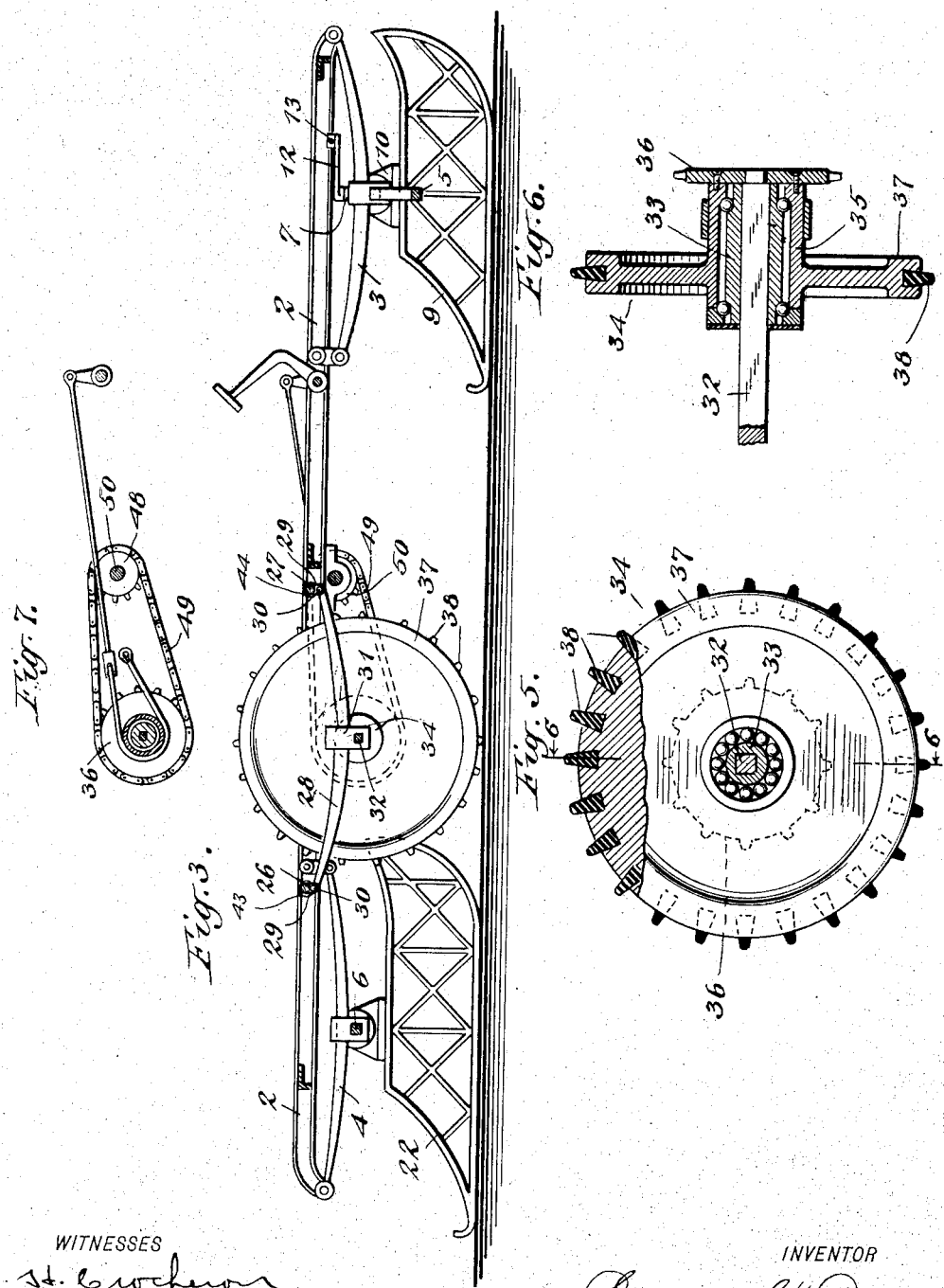

UNITED STATES PATENT OFFICE.

EUGENE S. H. PEREYRA, OF BROOKLYN, NEW YORK.

AUTOMOBILE.

No. 893,867.    Specification of Letters Patent.    Patented July 21, 1908.

Application filed December 28, 1907. Serial No. 408,446.

*To all whom it may concern:*

Be it known that I, EUGENE STEPHENSON HUMBERT PEREYRA, a subject of the King of Italy, residing at Brooklyn, in the county of New York and State of New York, have invented new and useful Improvements in Automobiles, of which the following is a complete and clear specification.

My invention relates to means whereby an automobile may be converted into an automobile sled by simply removing the wheels and putting in their places runners, and attaching a sub-structure which carries spiked drive wheels adapted to be driven by the sprockets usually employed to drive the rear wheels; or if the automobile be of the shaft drive type, sprockets may be mounted on the rear shaft to drive said spiked wheels.

My object is to provide sleighing attachments which may be put on any automobile without materially changing the existing structure of same. I attain these objects, as shown in the accompanying drawings, illustrating a chain drive automobile with sleighing attachments mounted thereon.

In the drawings, Figure 1 is a side elevation of an automobile with sleighing attachments in place. Fig. 2 is a plan view of the chassis, showing the drive and general arrangement of parts. Fig. 3 is a section on the line 3—3 of Fig. 2. Fig. 4 is a perspective view of the sub-structure. Fig. 5 is a detail of one of the spiked drive wheels. Fig. 6 is a section on the line 6—6 of Fig. 5.
Fig. 7 is a detail section showing the drive and one form of brake.

In the drawings similar numbers refer to similar parts throughout.

The body of the car 1 is mounted on the frame 2, which carries the half elliptic springs 3 and 4. The spring 3 carries the usual front axle 5, and the spring 4 carries the rear axle 6.

Pivotally mounted on the axle 5 are the usual trunnions 7 (see Fig. 2) for the wheels 8; or the runners 9 carrying bearings 10. The bearings 10 are fastened to said trunnions 7 by nuts 11, which may be put on with a spanner wrench or the like.
The trunnions 7 pivoted at 21, are operated by the usual form of steering gear which consists of a steering wheel 19, secured on the shaft 20, which also has fast to it a worm 18, which meshes with a worm wheel 17. The worm 17 has fast to it a radial arm 16. The trunnions 7 pivoted at 21 each carry an arm 12, said arms being connected by a link 13. The right hand trunnion carries a second arm 14 which is connected to the radial arm 16 with a link 15.
It will be readily understood that by turning the steering wheel 19, the shaft 20 and worm 18 are also caused to turn, as is also the worm wheel 17. The arm 16 will receive an angular movement and transmit it to the link 15 and arms 14 and 12, thereby turning the trunnions on their vertical pivots 21 and cause the runners which are mounted on them to move. Therefore it will be understood that as far as steering is concerned the automobile need not be changed, because the runners 9 are carried on the same trunnions 7 as are the wheels 8, when used.

The rear runners 22 are also mounted on the same trunnions 23 that are usually used for the rear wheels, and are fastened to said trunnions by nuts 24. The rear and front sleds are so mounted that they may turn freely on the trunnions 23 and 7 respectively, to compensate for inequalities in the road.

On the rear portion of the frame 2, I attach a substructure 25, composed of two cross rods 26 and 27 and two longitudinal half elliptic springs 28—28. The springs 28 are loosely fastened to lugs 29, depending from the rods 26 and 27 by pins 30 passing through said lugs and eyes in the ends of said springs 28.

Fastened at the center of the springs 28 are blocks 31 which support the axle 32. At the outer ends of the axle 32 is securely fastened a sleeve 33 (see Fig. 6) forming part of the ball bearings for the spiked drive wheels 34. Each wheel 34 has an elongated hub 35 forming part of the ball bearing, and has securely fastened at its outer end a sprocket wheel 36.

The wheels 34 are cast with an annular flange 37 and have spikes 38 of hard rubber, or other suitable material, around their peripheries.

The sub-structure 25 is attached to the frame as follows: On one side of the frame 2, large clearance holes are drilled so that the rods 26 and 27 may be passed through them. The ends 39 and 40 of the rods 26 and 27 are passed through said clearance holes and then carefully withdrawn enough to let the ends 41 and 42 enter the correct sized holes on the opposite side of the frame. The clearance holes are then fitted with bushings 43 and 44, which are drilled to fit the rods 26 and 27 snugly. The rod 27 is rigidly bolted to the frame 2 by the nuts 45, and the rod 26 is loosely mounted in the bushing 43 on one side and the frame 2 on the other side, the nuts 46 bearing against the shoulders 47 of the rod 26 merely preventing the rod from slipping out. The springs tend to keep the spiked wheels 34 in contact with the roadbed, and the spikes 38 dig in said roadbed and give the wheels a good purchase to drive by. The sprockets 36 are driven by the usual drive sprockets 48 and chains 49; said drive sprockets 48 being driven in the usual manner through the shaft 50, differential 51, transmission gearing 52 and the clutch 53 controlled in the usual manner and driven by the engine 54. Therefore, to convert an automobile into a vehicle for sleighing, it is only necessary to remove the four wheels and the two drive chains, and put in their places the sleigh runners 9 and 22, attach the sub-structure 25 as described above and connect the drive sprockets 48 with the sprockets 36 by the chains 49.

When the clutch 53 is thrown in by the usual means, the spiked wheels will be caused to rotate and propel the car, the course being controlled by the steering means described.

Having now described my invention, what I claim is:

1. In a convertible automobile, a detachable sub-structure, yieldingly connected to said automobile; which sub-structure may be attached by passing transverse cross rods through holes in the main frame of said automobile and fastening said rods to the frame by nuts substantially as described.

2. A detachable structure, consisting of cross rods carrying springs with an axle rigidly connected to them, said axle having spiked drive wheels with sprockets secured to them, mounted for rotation on said axle, said structure being adapted to be fastened to the main frame of an automobile.

EUGENE S. H. PEREYRA.

Witnesses:
H. CROCHERON,
GEO. PÜLSCHEN.